United States Patent
Elson et al.

(10) Patent No.: US 8,760,027 B2
(45) Date of Patent: Jun. 24, 2014

(54) STATOR

(75) Inventors: Ricky Elson, Kyoto (JP); Yabo Hu, Kyoto (JP); Nobufuji Kaji, Kyoto (JP)

(73) Assignee: Nidec Corporation, Kyoto (JP)

( * ) Notice: Subject to any disclaimer, the term of this patent is extended or adjusted under 35 U.S.C. 154(b) by 144 days.

(21) Appl. No.: 13/562,339

(22) Filed: Jul. 31, 2012

(65) Prior Publication Data

US 2013/0043758 A1    Feb. 21, 2013

(30) Foreign Application Priority Data

Aug. 20, 2011 (JP) .................................. 2011-180011

(51) Int. Cl.
*H02K 3/48* (2006.01)
(52) U.S. Cl.
USPC ........................................................ 310/214
(58) Field of Classification Search
CPC ........... H02K 3/527; H02K 3/30; H02K 3/48; H02K 3/493; H02K 3/487; H02K 3/34
USPC ................. 310/214, 215, 79, 97, 74
See application file for complete search history.

(56) References Cited

U.S. PATENT DOCUMENTS

| | | | |
|---|---|---|---|
| 6,683,398 B2 * | 1/2004 | Tong et al. | 310/214 |
| 6,822,356 B2 * | 11/2004 | Suzuki et al. | 310/71 |
| 8,269,387 B2 * | 9/2012 | Endo et al. | 310/71 |
| 2010/0244617 A1 * | 9/2010 | Nobata et al. | 310/216.069 |
| 2012/0256511 A1 * | 10/2012 | Haruno | 310/215 |

FOREIGN PATENT DOCUMENTS

| | | |
|---|---|---|
| JP | 60-022432 A | 2/1985 |
| JP | 2001-327109 A | 11/2001 |
| JP | 2002-305851 A | 10/2002 |
| JP | 2008-263719 A | 10/2008 |
| JP | 2008-312288 A | 12/2008 |
| JP | 2010-051087 A | 3/2010 |
| JP | 2010-246269 A | 10/2010 |
| JP | 2011-135640 A | 7/2011 |

* cited by examiner

*Primary Examiner* — Hanh Nguyen
(74) *Attorney, Agent, or Firm* — Keating & Bennett, LLP

(57) ABSTRACT

A stator includes a core-back portion, teeth portions, insulators, and coils. The teeth portions extend radially from a circumferential surface of the core-back portion. The insulators are respectively mounted to the teeth portions. The coils are respectively mounted to the insulators. A tip end of the tooth portion has a circumferential width equal to or smaller than that of a base end of the tooth portion. The tip end has an axial width equal to or smaller than that of the base end. The insulator includes a tube portion accommodating the tooth portion. The tube portion includes a first opening existing at the tip end and a second opening existing at the base end. The first opening has an axial width smaller than an axial width of the second opening in a state that each of the insulators is removed from each of the teeth portions.

7 Claims, 12 Drawing Sheets

STATOR

BACKGROUND OF THE INVENTION

1. Field of the Invention

The present invention relates to a stator and more specifically to a stator preferably for use in a rotary electric machine such as, for example, a motor or a generator.

2. Description of the Related Art

Coils of an armature are typically formed by winding lead wires on the teeth of an iron core. In this method, difficulties are often involved in winding the lead wires because the adjoining teeth or the umbrellas formed at the tip ends of the teeth become obstacles. These difficulties become severe if an attempt is made to increase the space factor of the coils or if the winding speed is increased in order to rapidly wind the lead wires. As a solution to this problem, Japanese Patent Application Publication No. 2008-312288 discloses a method in which lead wires are wound on an insulator and then the insulator provided with coils is fitted to the teeth having no umbrella.

However, when a motor is actually manufactured using the method of Japanese Patent Application Publication No. 2008-312288, a shortcoming is encountered. In a motor manufactured using the method of Japanese Patent Application Publication No. 2008-312288, the task of fitting the insulator to the teeth is somewhat difficult while the task of winding the lead wires on the insulator as a single body is relatively easy. Additionally, the insulator may be damaged unless the task of fitting the insulator to the teeth is performed with care. The lead wires are wound on the insulator after the insulator is inserted into and stably supported on a jig. However, it is often difficult to remove the insulator from the jig, thereby worsening the workability.

SUMMARY OF THE INVENTION

Preferred embodiments of the present invention provide a stator capable of solving at least one of the problems noted above.

An illustrative stator of a preferred embodiment of the present invention preferably includes an annular core-back portion, a plurality of teeth portions, a plurality of insulators, and a plurality of coils. The teeth portions extend radially from a circumferential surface of the core-back portion. The insulators are respectively mounted to the teeth portions. The coils are respectively mounted to the insulators. Each of the teeth portions preferably includes a tip end and a base end. The tip end preferably has a circumferential width equal to or smaller than a circumferential width of the base end. The tip end preferably has an axial width equal to or smaller than an axial width of the base end. Each of the insulators includes a tube portion for accommodating each of the teeth portions. The tube portion preferably includes a first opening existing at the tip end of each of the teeth portions and a second opening existing at the base end of each of the teeth portions. The first opening preferably has an axial width smaller than an axial width of the second opening in a state that each of the insulators is removed from each of the teeth portions.

With such configuration, it is easy to perform the task of fitting the insulator wound with the lead wire to the teeth having no umbrella. In case of using a method in which the lead wire is wound on the insulator fitted to a jig, it is easy to carry out the task of removing the insulator wound with the lead wire from the jig.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side along the center axis direction of a motor will be just referred to as "upper" and the lower side as "lower". The up-down direction is not intended to indicate the positional relationship and orientation of the motor after it has been installed in an actual device.

First Preferred Embodiment

Figure 1:
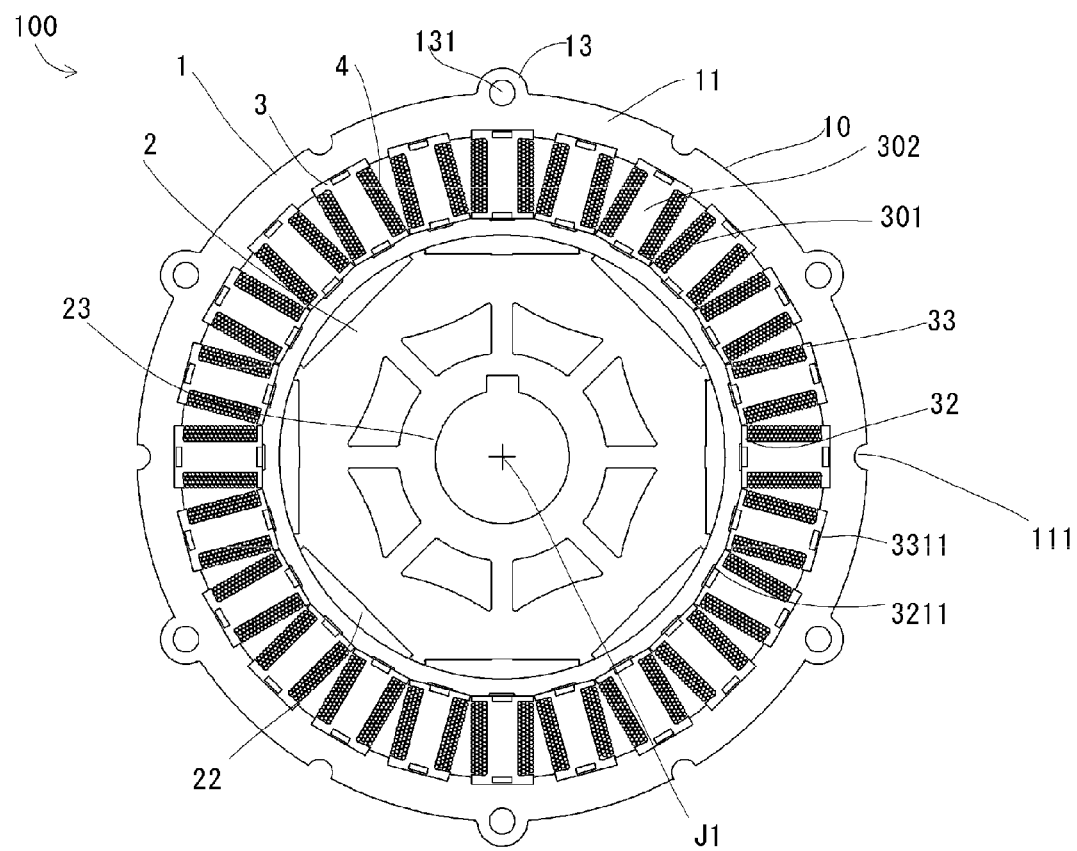
FIG. 1 is a plan view showing a motor according to a first preferred embodiment of the present invention.
Figure 2:
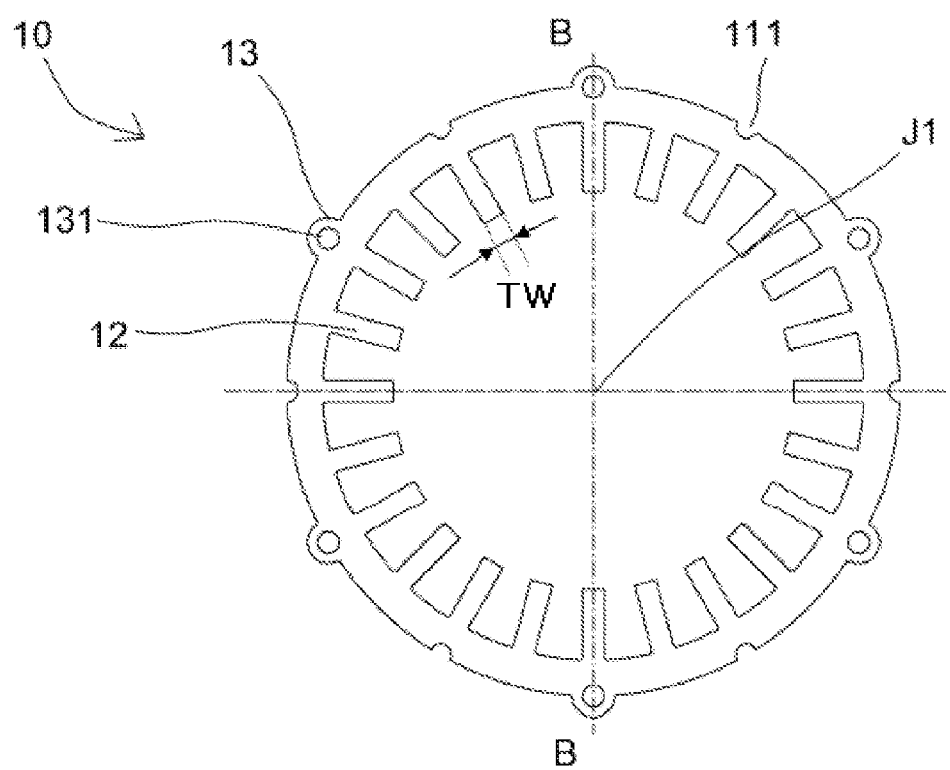
FIG. 2 is a plan view showing a stator core according to the first preferred embodiment of the present invention.
Figure 3:
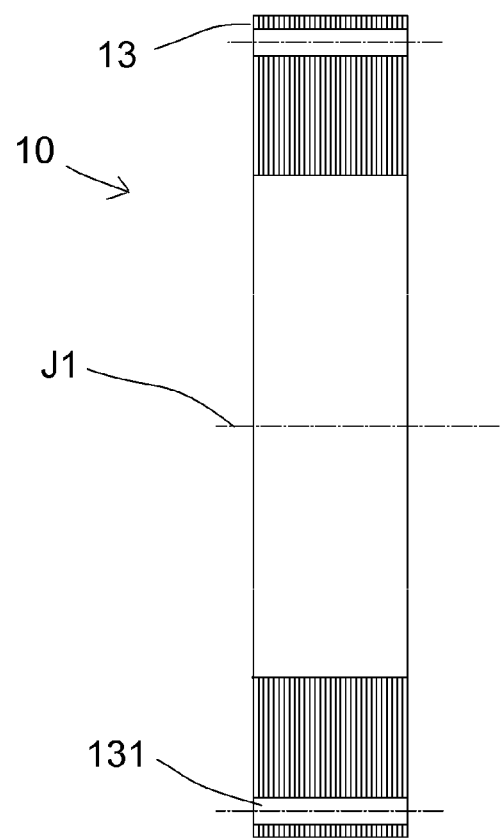
FIG. 3 is a sectional view of the stator core according to the first preferred embodiment of the present invention.

FIG. 1 is a plan view showing a motor 100 according to a first preferred embodiment of the present invention. FIG. 2 is a plan view showing a stator core 10 according to the first preferred embodiment. FIG. 3 is a sectional view of the stator core 10 taken along line III-III in FIG. 2.

As shown in FIG. 1, the motor 100 preferably includes a stator 1 and a rotor 2. The motor 100 shown in FIG. 1 is a so-called inner-rotor-type motor. The rotor 2 is arranged to radially oppose to the stator 1 and can be rotated in the circumferential direction about the center axis J1. The stator 1 preferably includes a stator core 10, insulators 3, and coils 4. The rotor 2 preferably includes a rotor core 21, a plurality of rotor magnets 22, and a shaft 23.

As shown in FIGS. 1, 2 and 3, the stator core 10 preferably includes a core-back portion 11 and a plurality of teeth portions 12. The stator core 10 is preferably formed by laminating electromagnetic steel plates one above another, however, any other desirable type of stator core and method of forming could be used instead. The laminated electromagnetic steel plates are preferably fixed to one another by, e.g., caulking or laser welding. Alternatively, the electromagnetic steel plates may be fixed to one another by any other desirable methods.

The core-back portion 11 is preferably a member annularly extending about the center axis J1. The respective teeth portions 12 extend radially inward from the inner circumferential surface of the core-back portion 11. The teeth portions 12 are arranged at a regular interval along the inner circumferential surface of the core-back portion 11. In the first preferred embodiment, the number of slots (the number of slot gaps of the teeth portions) N is preferably twenty four, for example. Alternatively, the number of slots N may be other numbers than twenty four if so desired.

As shown in FIG. 2, a plurality of grooves 111 is arranged on the outer surface of the core-back portion 11. On the outer surface of the core-back portion 11, the grooves 111 are arranged at a regular interval in the circumferential direction. The grooves 111 are arranged radially outward of the teeth portions 12 with the core-back portion 11 interposed therebetween. As shown in FIG. 2, the grooves 111 preferably have a semicircular or substantially semicircular shape when seen in the axial direction. In the first preferred embodiment, the grooves 111 extend from the axial upper end surface to the axial lower end surface on the outer surface of the core-back portion 11.

The grooves 111 may not necessarily extend from the axial upper end surface to the axial lower end surface. The grooves 111 may be recesses which are respectively defined in the axial upper and lower end surfaces of the core-back portion 11.

The shape of the grooves 111 is not limited to the semicircular or substantially semicircular shape when seen in a plan view. As an alternative example, the grooves 111 may have, e.g., a rectangular shape or a polygonal shape when seen in a plan view.

On the outer surface of the core-back portion 11, laser welding, for example, is preferably performed at a plurality of points along the circumferential direction. The laser welding is performed in the positions adjacent to the grooves 111 at the circumferential left and right sides thereof. The welding positions may be appropriately changed as so desired.

A plurality of protrusions 13 is provided on the outer surface of the core-back portion 11. The protrusions 13 are arranged at a regular interval in the circumferential direction. In FIG. 2, the protrusions 13 are preferably arranged at six points (at an equal interval of about 60 degrees about the center axis J1), for example. The protrusions 13 have a substantially semicircular external shape when seen in the axial direction. The external shape of the protrusions 13 is not particularly limited. The protrusions 13 may have, e.g., a substantially rectangular shape or a substantially polygonal shape when seen in a plan view.

As shown in FIGS. 1 and 2, each of the protrusions 13 preferably has a through-hole 131 extending in the axial direction. Screws or the like, for example, are inserted through the through-holes 131 of the protrusions 13 when the stator core 10 is attached to a case or the like.

Figure 4:
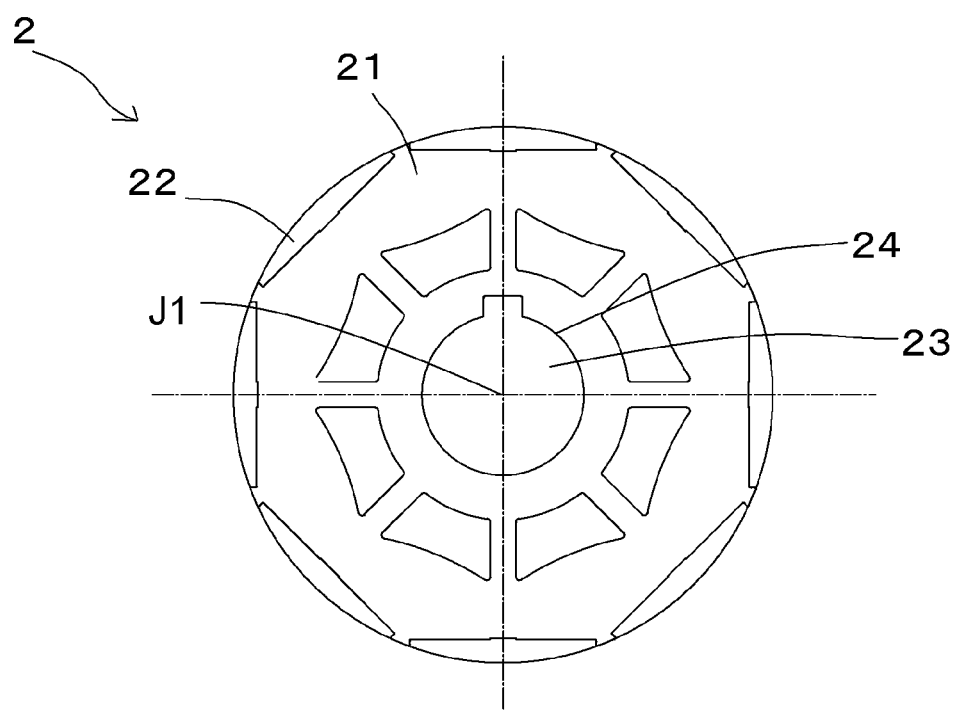
FIG. 4 is a plan view showing a rotor according to the first preferred embodiment of the present invention.

FIG. 4 is a plan view of the rotor 2 according to the first preferred embodiment. The rotor core 21 is preferably formed by laminating electromagnetic steel plates one above another. However, it is also possibly to provide any other desirable type of rotor core and method of forming. The laminated electromagnetic steel plates are preferably fixed to one another by, e.g., caulking or laser welding. In the rotor core 21, the electromagnetic steel plates are preferably caulked, e.g., on the axial upper and lower end surfaces of the rotor core 21. In the rotor core 21, welding is preferably performed, e.g., at a plurality of circumferential points on the outer surface of the rotor core 21.

A shaft hole 24 is preferably defined substantially at the center of the rotor core 21. A shaft 23 is inserted into the shaft hole 24. The shaft 23 and the rotor 2 are preferably fixed to each other by, e.g., press-fitting or bonding.

As shown in FIG. 4, a plurality of rotor magnets 22 is arranged on the outer surface of the rotor core 21. In the first preferred embodiment, the rotor 2 preferably has a configuration for an SPM (Surface Permanent Magnet) motor. By providing through-holes in the rotor core 21, the rotor magnets 22 may be embedded in the rotor core 21. In other words, the rotor 2 may have a configuration for an IPM (Interior Permanent Magnet) motor.

The rotor magnets 22 may be fixed to the rotor core 21 by, e.g., caulking, bonding or welding. In the first preferred embodiment, the number of poles P is preferably eight, for example. The number of poles P may be changed in conformity with the specifications of the motor 100 or the number of slots N.

As shown in FIG. 4, when seen in a plan view, the rotor magnets 22 are arranged on the outer surface of the rotor 2 in a symmetrical relationship with respect to the center axis J1. As can be seen in FIG. 1, the rotor magnets 22 are radially opposed to the teeth portions 12.

Figure 5A:
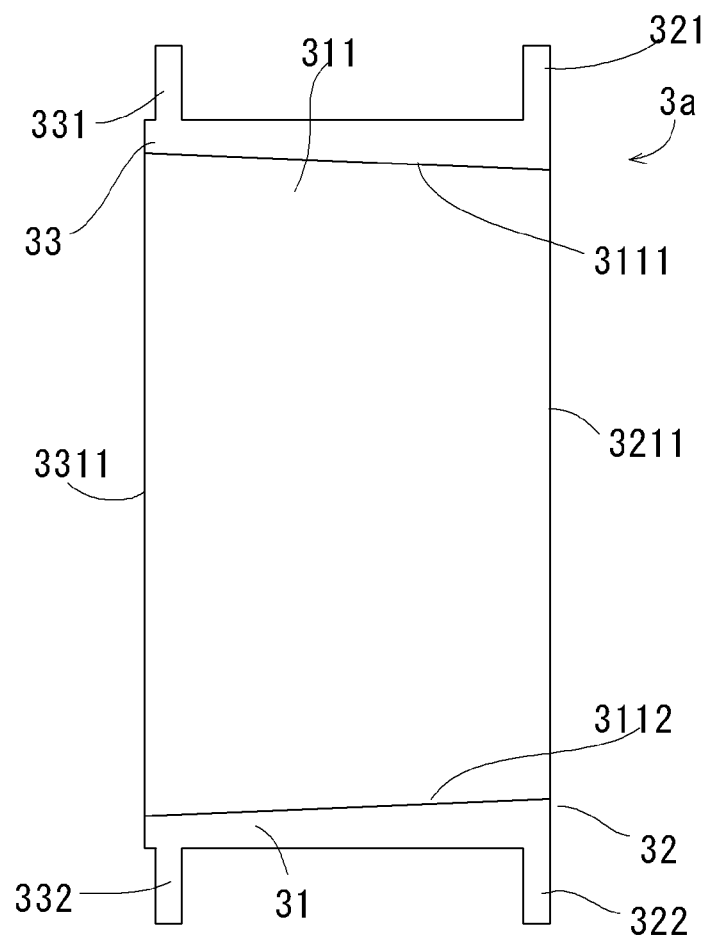
FIGS. 5A and 5B are views showing an insulator according to the first preferred embodiment of the present invention.
Figure 5B:
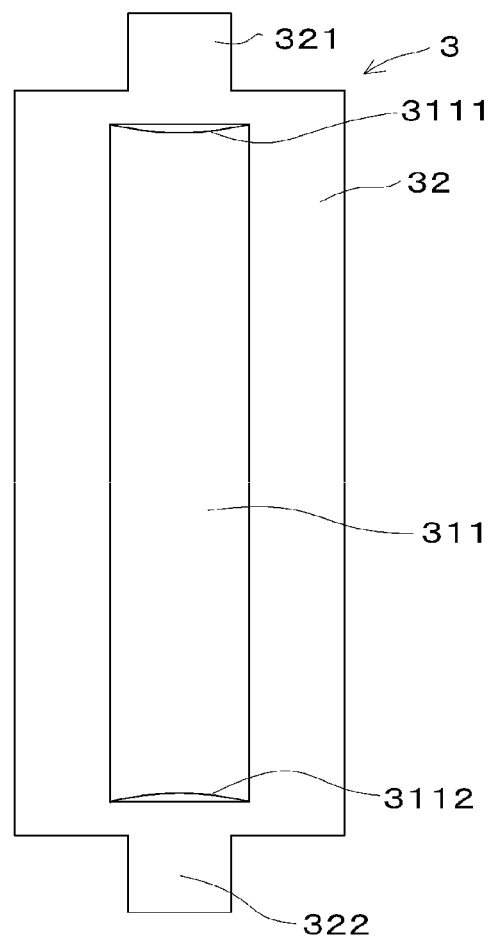

As shown in FIGS. 1, 5A, and 5B, each of the insulators 3 preferably includes a tube portion 31. The tube portion 31 preferably includes a pair of side walls 301 extending in the center axis direction and widening in the radial direction and a pair of horizontal walls 302 extending in the circumferential direction and widening in the radial direction. The tube portion 31 preferably includes a first opening 3211 at one longitudinal end thereof and a second opening 3311 at the other longitudinal end thereof. A first flange 32 is preferably provided at one longitudinal end of the tube portion 31. The first flange 32 preferably extends from one longitudinal end of the tube portion 31 in the direction perpendicular or substantially perpendicular to the longitudinal direction of the tube portion 31. A second flange 33 is preferably provided at the other longitudinal end of the tube portion 31. The second flange 33 extends from the other longitudinal end of the tube portion 31 in the direction perpendicular or substantially perpendicular to the longitudinal direction of the tube portion 31. When the insulators 3 are attached to the teeth portions 12, the first flange 32 is positioned radially inward of each of the teeth portions 12 (at the tip end side of each of the teeth portions 12) and the second flange 33 is positioned is positioned radially outward of each of the teeth portions 12 (at the base end side of each of the teeth portions 12, namely at the side of the connection portion of each of the teeth portions 12 and the core-back portion 11). The first opening 3211 of the tube portion 31 is positioned at the tip end side of each of the teeth portions 12. The second opening 3311 of the tube portion 31 is preferably positioned at the base end side of each of the teeth portions 12.

When seen in the longitudinal direction of the tube portion 31, the first flange 32, and the second flange 33 have a substantially rectangular shape. When seen in the longitudinal direction of the tube portion 31, the external shape of the first flange 32 is preferably the same or substantially the same as the external shape of the second flange 33.

As shown in FIGS. 5A and 5B, a first upper lug 321 protruding axially upward is preferably provided at the axial upper end of the first flange 32. A first lower lug 322 protruding axially downward is preferably provided at the axial lower end of the first flange 32. Similarly, a second upper lug 331 and a second lower lug 332 are preferably respectively provided at the axial upper and lower ends of the second flange 33. The first upper lug 321, the first lower lug 322, the second upper lug 331, and the second lower lug 332 preferably have an identical shape, i.e., a substantially rectangular parallelepiped shape in the present preferred embodiment.

As shown in FIG. 1, when the insulators 3 are attached to the teeth portions 12, the connection portion of the second flange 33 and the tube portion 31 is arranged to axially overlap with the core-back portion 11. Likewise, the second upper lug 331 and the second lower lug 332 are preferably arranged to axially overlap with the core-back portion 11. When the insulators 3 are attached to the teeth portions 12, the tip end of each of the teeth portions 12 preferably protrudes radially inward beyond the first flange 32.

As shown in FIGS. 1, 5A, and 5B, the radial width of the first upper lug 321 and the first lower lug 322 is preferably smaller than the radial width of the first flange 32. The radial width of the second upper lug 331 and the second lower lug 332 is preferably smaller than the radial width of the second flange 33. The second upper lug 331 and the second lower lug 332 are preferably positioned closer to the first flange 32 than the radial outer end of the second flange 33. In other words, a gap exists between the second upper lug 331 and the radial outer end of the second flange 33 (the other longitudinal end of the tube portion 31). A gap exists between the second lower lug 332 and the radial outer end of the second flange 33. By extending the radial outer end of the second flange 33 radially outward beyond the second upper lug 331 in this manner, it is possible to increase the contact area between the second flange 33 and the core-back portion 11. This increase in the contact area helps reduce the load applied to the teeth portions 12 provided by the insulators 3. In other words, if the contact area between the second flange 33 and the core-back portion 11 is small, the load is concentrated on the teeth portions 12 when the stresses are axially applied from the outside to the insulators 3. On the other hand, if the contact area between the second flange 33 and the core-back portion 11 is large, the stresses applied from the outside through the insulators 3 are dispersed to the teeth portions 12 and the core-back portion 11. Thus the load acting against the teeth portions 12 becomes smaller.

As shown in FIGS. 1, 5A, and 5B, the width of the first upper lug 321 and the first lower lug 322 in the direction perpendicular or substantially perpendicular to the longitudinal direction of the tube portion 31 is preferably smaller than the width of the first flange 32. The width of the second upper lug 331 and the second lower lug 332 in the direction perpendicular or substantially perpendicular to the longitudinal direction of the tube portion 31 is preferably smaller than the width of the second flange 33.

In the first preferred embodiment, the first upper lug 321, the first lower lug 322, the second upper lug 331, and the second lower lug 332 are preferably identical in shape. However, the respective lugs may differ in shape from one another or the respective lugs may be provided in pairs each having an identical shape.

As shown in FIG. 1, a coil 4 is preferably mounted to the tube portion 31 of each of the insulators 3. The coil 4 is preferably formed by winding a lead wire about the tube portion 31. The coil 4 is preferably connected to, for example, a circuit board or an external power source through a bus bar and so forth. The tube portion 31 wound with the coil 4 is preferably fitted to each of the teeth portions 12 from the tip end of the latter and is fixed to each of the teeth portions 12 by, for example, press-fitting. However, the method of fixing the tube portion 31 is not limited to the press-fitting. For example, the tube portion 31 may alternatively be adhesively fixed in a loosely-fitted state. In the motor 100, if an electric current flows from the external power source to the coil 4, torque is generated in the rotor 2 by the interaction between the magnetic flux generated in the coil 4 and the magnetic flux generated by the rotor magnets 22.

The circumferential width of the tip end of each of the teeth portions 12 is preferably equal to or smaller than the circumferential width of the base end thereof. Further, the axial width of the tip end of each of the teeth portions 12 is preferably equal to or smaller than the axial width of the base end thereof. Thus, each of the insulators 3 wound with the coil 4 can be fitted (i.e., mounted) to each of the teeth portions 12. In other words, each of the teeth portions 12 can be accommodated within each of the insulators 3. This eliminates the need to wind coils on the insulators 3 in a state where the insulators 3 are fitted to the teeth portions 12. Each of the insulators 3 wound with the coil 4 can be readily attached to each of the teeth portions 12. This makes it possible to reduce the assembling steps of a rotary electric machine such as, for example, a motor or a generator. In this description, the expression that "the circumferential width of the tip end of each of the teeth portions 12 is equal to the circumferential width of the base end thereof" means that each of the teeth portions 12 preferably does not include a portion called an umbrella which is employed in a tooth of a typical stator core. It is not required that the circumferential width of the tip end of each of the teeth portions 12 be strictly and perfectly equal to the circumferential width of the base end thereof. If the width of the tip end of each of the teeth portions is so narrow that each of the insulators included in the present preferred embodiment can be fitted to the tip end of each of the teeth portions, it is possible to implement one of the technical concepts of a preferred embodiment of the present invention. This arrangement falls within the scope of a preferred embodiment of the present invention.

As shown in FIG. 1, when seen in the axial direction, the circumferential width of each coil 4 is preferably smaller than the circumferential width of the first flange 32 and the second flange 33. While not shown in the drawings, the axial upper portion of the coil 4 is positioned axially lower than the first upper lug 321 and the second upper lug 331. Similarly, the axial lower portion of the coil 4 is positioned axially higher than the first lower lug 322 and the second lower lug 332. Thus, the coil 4 is prevented from making contact with another coil 4 adjoining thereto.

FIGS. 5A and 5B are views showing the detailed shape of the insulator 3 in the first preferred embodiment. FIG. 5A is a right side sectional view of the insulator 3 and FIG. 5B is a front view of the insulator 3. As shown in FIG. 5A, the axial width of the first opening 3211 at one end of the tube portion 31 is smaller than the axial width of the second opening 3311 at the other end of the tube portion 31. The inner surfaces of the insulator 3 (namely, the surfaces defining the throughhole 311) are tapered from one end of the tube portion 31 toward the other end of the tube portion 31. In other words, the axial dimension of the through-hole 311 is preferably gradually increased from one longitudinal end of the tube portion 31 toward the other longitudinal end thereof.

In the inner surfaces of the tube portion 31 (the inner surfaces defining the through-hole 311), as shown in FIG. 5B, the axial upper surface (the surface existing near the first upper lug 321 and the second upper lug 331) becomes an upper taper surface 3111. The axial lower surface (the surface existing near the first lower lug 322 and the second lower lug 332) becomes a lower taper surface 3112.

As set forth above, when assembling the stator 1, the insulator 3 wound with the coil 4 is fitted to each of the teeth portions 12. When winding the coil 4 on the insulator 3, a jig is inserted into the through-hole 311 of the insulator 3. The jig is preferably inserted from the side of the second opening 3311 of the tube portion 31 toward the side of the first opening 3211 thereof. The insulator 3 is kept stable by inserting the jig. This makes it easy to perform the task of winding a lead wire with a winding machine (not shown). The external shape of the jig conforms to the shape of the through-hole 311. In other words, the jig preferably includes surfaces opposing to the upper taper surface 3111 and the lower taper surface 3112 of the through-hole 311 and extending parallel or substantially parallel to the upper taper surface 3111 and the lower taper surface 3112. With the insulator shape and the jig shape stated above, the insulator 3 is stably held by the jig. This is because the inner surfaces of the insulator 3 make close contact with the surfaces of the jig when the jig is attached to the insulator 3.

The insulator 3 of a preferred embodiment of the present invention can be easily removed from the jig after winding a lead wire thereon. The jig is preferably removed in the direction opposite to the insertion direction, namely from the side of the first opening 3211 of the tube portion 31 toward the side of the second opening 3311 thereof. The jig is preferably tapered toward the side of the first opening 3211 of the tube portion 31. Since the external shape of the jig conforms to the shape of the through-hole 311, the gap between the outer surfaces of the jig and the inner surfaces of the through-hole 311 increases as the jig is removed from the insulator 3. Accordingly, even if a strong external force is applied from the coil 4 to the insulator 3, and even if the external shape of the through-hole 311 is collapsed, the jig does not interfere with the insulator 3 and can be easily removed from the insulator 3. Therefore, with the insulator 3 of the present preferred embodiment, the coil 4 can be wound on the insulator 3 with an external force in the winding step without having to consider the difficulty encountered in the subsequent step (e.g., the difficulty involved in removing the jig from the insulator 3). It is also not necessary that the tension applied to the lead wire in the winding step be adjusted in consideration of the ease of detachment of the insulator 3. If the coil winding method is applied to the insulator 3 having the taper surfaces in this manner, it becomes easy to remove the jig from the insulator 3 wound with the coil. This helps enhance the work efficiency in the winding step.

Alternatively, the external shape of the jig may not conform to the shape of the through-hole 311. For example, the upper and lower surfaces of the jig may be parallel or substantially parallel to each other. In that case, the gap between the upper taper surface 3111 of the through-hole 311 and the upper surface of the jig and the gap between the lower taper surface 3112 of the through-hole 311 and the lower surface of the jig are increased from the side of the second opening 3311 of the tube portion 31 toward the side of the first opening 3211. In this configuration, a clearance is provided between the jig and the through-hole 311 of the insulator 3. This makes it easy to remove the insulator 3 from the jig after winding the lead wire on the insulator 3.

Since the inner surfaces of the through-hole 311 of the insulator 3 of a preferred embodiment of the present invention are provided with the taper surfaces as stated above, it is easy to fit the insulator 3 wound with the lead wire to each of the teeth portions 12. This effect is equally obtainable in the event that the lead wire is wound on the insulator 3 with no use of the jig. In usual cases, no gap is left between the insulator and the tooth in an effort to increase the space factor. However, if the insulator is fitted to the tooth after winding the lead wire on the insulator, the winding task becomes easy to perform and a margin is left in the space factor. Accordingly, as in a preferred embodiment of the present invention, it is preferable to leave a gap between the insulator and the tooth even through the space factor is slightly sacrificed.

The insulator may also preferably have additional features to be described below. The axial height of the opening (the distance between the upper taper surface 3111 and the lower taper surface 3112) at one side of the tube portion 31 (at the side where the first flange 32 exists) is preferably smaller than the axial height of each of the teeth portions 12. The axial height of the opening (the distance between the upper taper surface 3111 and the lower taper surface 3112) at the other side of the tube portion 31 (at the side where the second flange 33 exists) is preferably larger than or substantially equal to the axial height of each of the teeth portions 12.

In FIG. 5B, when seen in the longitudinal direction of the tube portion 31, the central region of the upper taper surface 3111 protrudes downward. Similarly, the central region of the lower taper surface 3112 protrudes upward.

The insulator 3 is fitted to each of the teeth portions 12 at the other side of the tube portion 31. As mentioned above, the axial height of the tube portion 31 (the distance between the upper taper surface 3111 and the lower taper surface 3112) is preferably larger at the other longitudinal end of the tube portion 31 than at the one longitudinal end thereof. Moreover, the axial height of the opening at one longitudinal side of the tube portion 31 is preferably smaller than the axial height of each of the teeth portions 12. The axial height of the opening at the other longitudinal side of the tube portion 31 is preferably larger than or substantially equal to the axial height of each of the teeth portions 12. Therefore, when the insulator 3 is fitted to each of the teeth portions 12, the stress applied to the inner surfaces of the tube portion 31 by each of the teeth portions 12 increases as the tube portion 31 comes closer to the core-back portion 11 along each of the teeth portions 12. In other words, when fitting the insulator 3 to each of the teeth portions 12, the opening of the tube portion 31 existing at the side of the second flange 33 can be smoothly fitted to each of the teeth portions 12. As the tube portion 31 comes closer to the core-back portion 11, the interference portion corresponding to the difference between the axial width of each of the teeth portions 12 and the axial dimension of one longitudinal end of the through-hole 311 is gradually deformed. This makes it difficult to fit the insulator 3 to each of the teeth portions 12. Since the axial height of each of the teeth portions 12 is preferably larger than the distance between the upper taper surface 3111 and the lower taper surface 3112, an interference corresponding to the difference is generated between the through-hole 311 and each of the teeth portions 12. As a consequence, it is possible to smoothly fit the insulator 3 to each of the teeth portions 12 and to also prevent removal of the fitted insulator 3 from each of the teeth portions 12. In other words, the insulator 3 of the present preferred embodiment can provide an effect of preventing removal of the insulator 3 from each of the teeth portions 12.

The upper taper surface 3111 and the lower taper surface 3112 need not be necessarily provided over the total length of the inner surfaces of the tube portion 31.

Figure 6:
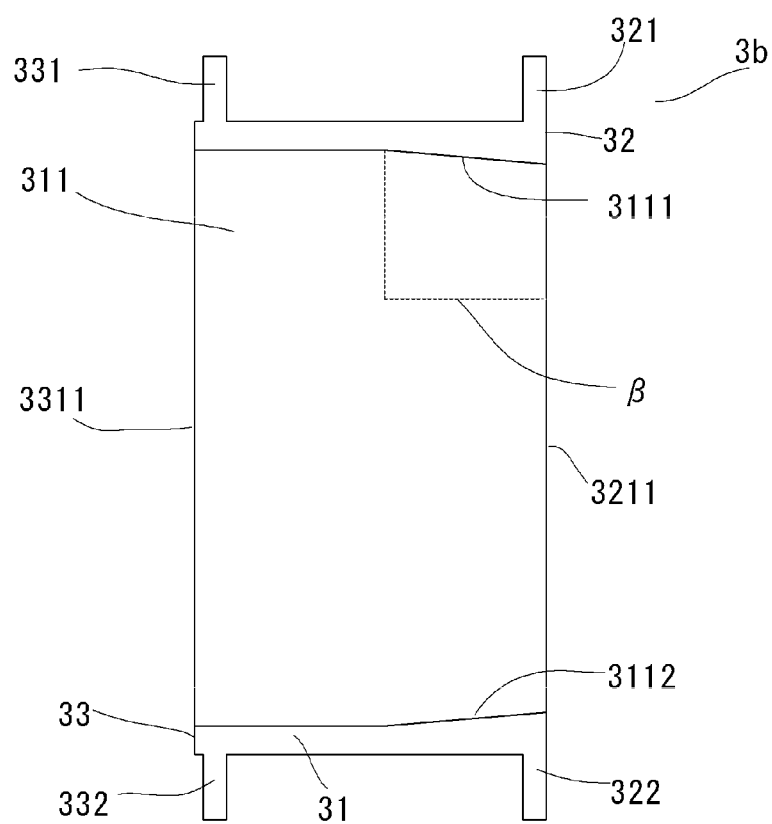
FIG. 6 is a view showing a modified example of the insulator according to a preferred embodiment of the present invention.

FIG. 6 is a sectional view showing an insulator 3b in which the inner surfaces of the tube portion 31 are provided in a taper shape. In FIG. 6, the distance β from the first flange 32 to the terminating points of the upper and lower taper surfaces 3111 and 3112 on the inner surfaces of the tube portion 31 in the longitudinal direction of the tube portion 31 is preferably equal to about 40% of the length of the tube portion 31, for example. In this insulator 3b, the taper surfaces are provided in the through-hole 311 of the tube portion 31. Therefore, even if a strong external force is applied from the coil to the insulator 3b and even if the external shape of the through-hole 311 is collapsed, it is easy to remove the jig from the insulator 3b. The dimensional relationship between the insulator 3b and each of the teeth portions 12 may preferably be set as follows. The distance between the upper taper surface 3111 and the lower taper surface 3112 is smaller than the axial dimension of each of the teeth portions 12. On the other hand, the distance between the upper planar surface adjoining to the upper taper surface 3111 and the lower planar surface adjoining to the lower taper surface 3112 is larger than, equal to, or substantially equal to the axial height of each of the teeth portions 12.

When assembling the stator 1, the insulator 3b is preferably fitted to each of the teeth portions 12 from the side of the second flange 33. With the structure stated above, when fitting the insulator 3b to each of the teeth portions 12, the insulator 3b is smoothly moved from the second flange 33 to the ends of the upper and lower planar surfaces adjoining to the upper and lower taper surfaces 3111 and 3112. Upon reaching the upper and lower taper surfaces 3111 and 3112, the tip end of each of the teeth portions 12 interferes with the upper and lower taper surfaces 3111 and 3112. As a consequence, it becomes possible to smoothly fit the insulator 3b to each of the teeth portions 12 and to prevent removal of the fitted insulator 3b from each of the teeth portions 12.

The value of the distance β is not limited to about 40% of the length of the tube portion 31 but may be greater than or less than about 40% of the length of the tube portion 31. In other words, when the insulator 3 is kept detached from each of the teeth portions 12, the gap between the inner surfaces of the side walls 301 or the gap between the inner surfaces of the horizontal walls 302 may be defined in a taper shape in at least a portion of the inner surfaces such that the gap increases from one side of the tube portion 31 toward the other side of the tube portion 31. In the insulator 3 shown in FIGS. 5A and 5B, the value of the distance β is equal to 100% of the length of the tube portion 31.

Figure 7A:
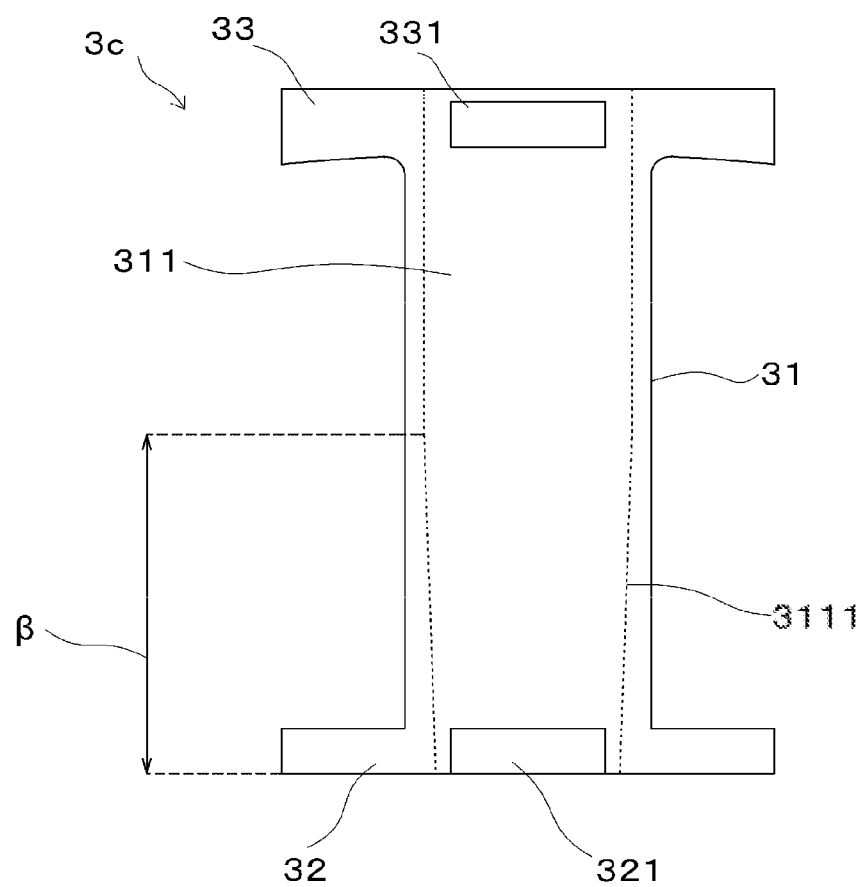
FIGS. 7A and 7B are views showing another modified example of the insulator according to a preferred embodiment of the present invention.
Figure 7B:
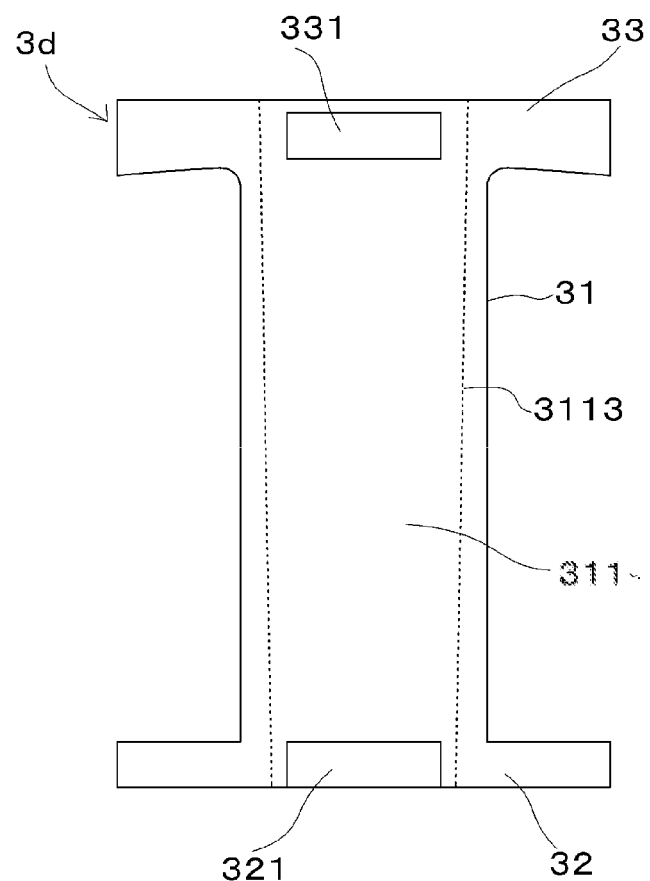

In the inner surfaces of the tube portion 31 (the surface defining the through-hole 311), the taper shape is not limited to the axial direction. FIGS. 7A and 7B are sectional views showing insulators 3c and 3d in which the inner surface of the tube portion 31 preferably has a taper shape. Referring to FIGS. 7A and 7B, a pair of taper surfaces 3111 symmetrical in the left-right direction is provided on the inner surfaces of the tube portion 31 opposing each other in the direction perpendicular or substantially perpendicular to the longitudinal direction of the tube portion 31 (in the left-right direction in FIGS. 7A and 7B). In the insulator 3c shown in FIG. 7A, the taper surfaces 3111 are provided such that the distance β from the first flange 32 to the terminating points of the taper surfaces 3111 becomes equal to about 40% of the length of the tube portion 31, for example. In the insulator 3d shown in FIG. 7B, the taper surfaces 3113 are preferably arranged to extend over the total length of the tube portion 31 (such that the distance β from the first flange 32 to the terminating points of the taper surfaces 3113 becomes equal to about 100% of the length of the tube portion 31). In the insulators shown in FIGS. 7A and 7B, the taper surfaces are preferably provided in the through-hole 311 of the tube portion 31. Therefore, even if a strong external force is applied from the coil to the insulator 3c or 3d and even if the external shape of the through-hole 311 is collapsed, it is easy to remove the jig from the insulator 3c or 3d.

The dimensional relationship between the insulator 3c and each of the teeth portions 12 may preferably be set as follows. As shown in FIG. 7A, the distance between the planar surfaces adjoining to the taper surfaces 3111 in the direction perpendicular or substantially perpendicular to the longitudinal direction of the tube portion 31 (in the left-right direction in FIG. 7A) is larger than or substantially equal to the width TW of each of the teeth portions 12 (the width in the direction perpendicular or substantially perpendicular to the extension direction of each of the teeth portions 12 and the axial direction). The distance between the taper surfaces 3111 in the direction perpendicular or substantially perpendicular to the longitudinal direction of the tube portion 31 (in the left-right direction in FIG. 7A) is smaller than the width TW of each of the teeth portions 12.

With the structure stated above, if the insulator 3c is fitted to each of the teeth portions 12 along the extension direction of the latter, the insulator 3c can be relatively smoothly moved from the second flange 33 to the ends of the planar surfaces adjoining to the taper surfaces 3111 in the longitudinal direction of the tube portion 31. If the tip end of each of the teeth portions 12 reaches the taper surfaces 3111 as a result of the movement of the insulator 3c, the taper surfaces 3111 interfere with the tip end of each of the teeth portions 12. Thus, an interference fit state is generated between each of the teeth portions 12 and the through-hole 311.

As a consequence, it becomes possible to smoothly fit the insulator 3c to each of the teeth portions 12 and to prevent removal of the fitted insulator 3c from each of the teeth portions 12.

In the insulator 3d shown in FIG. 7B, the distance between the taper surfaces 3113 at the open end near the second flange 33 in the direction perpendicular or substantially perpendicular to the longitudinal direction of the tube portion (in the left-right direction in FIG. 7B) is preferably larger than or substantially equal to the width TW of each of the teeth portions 12. The distance between the taper surfaces 3113 at the open end near the first flange 32 in the direction perpendicular or substantially perpendicular to the longitudinal direction of the tube portion 31 (in the left-right direction in FIG. 7B) is preferably smaller than the width TW of each of the teeth portions 12.

If the insulator 3d is fitted to each of the teeth portions 12 along the extension direction of the latter, the taper surfaces 3113 interfere with the tip end of each of the teeth portions 12 as a result of movement of the insulator 3d. Thus, an interference fit state is generated between each of the teeth portions 12 and the through-hole 311.

As a consequence, it becomes possible to smoothly fit the insulator 3d to each of the teeth portions 12 and to prevent removal of the fitted insulator 3d from each of the teeth portions 12.

The inner surfaces of the tube portion 31 (the surfaces defining the through-hole 311) may be defined by not only the taper surfaces but also surfaces having other shapes.

Figure 8A:
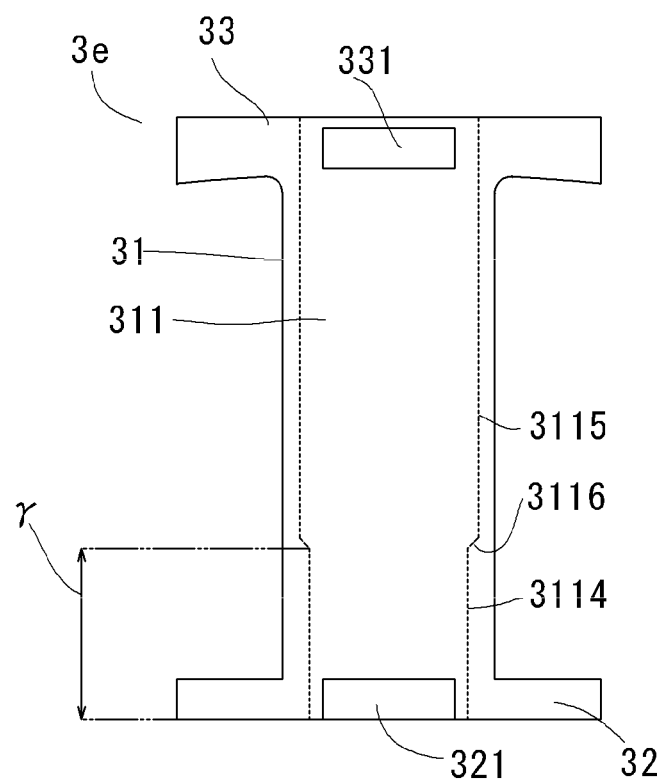
FIGS. 8A and 8B are views showing a further modified example of the insulator according to a preferred embodiment of the present invention.
Figure 8B:
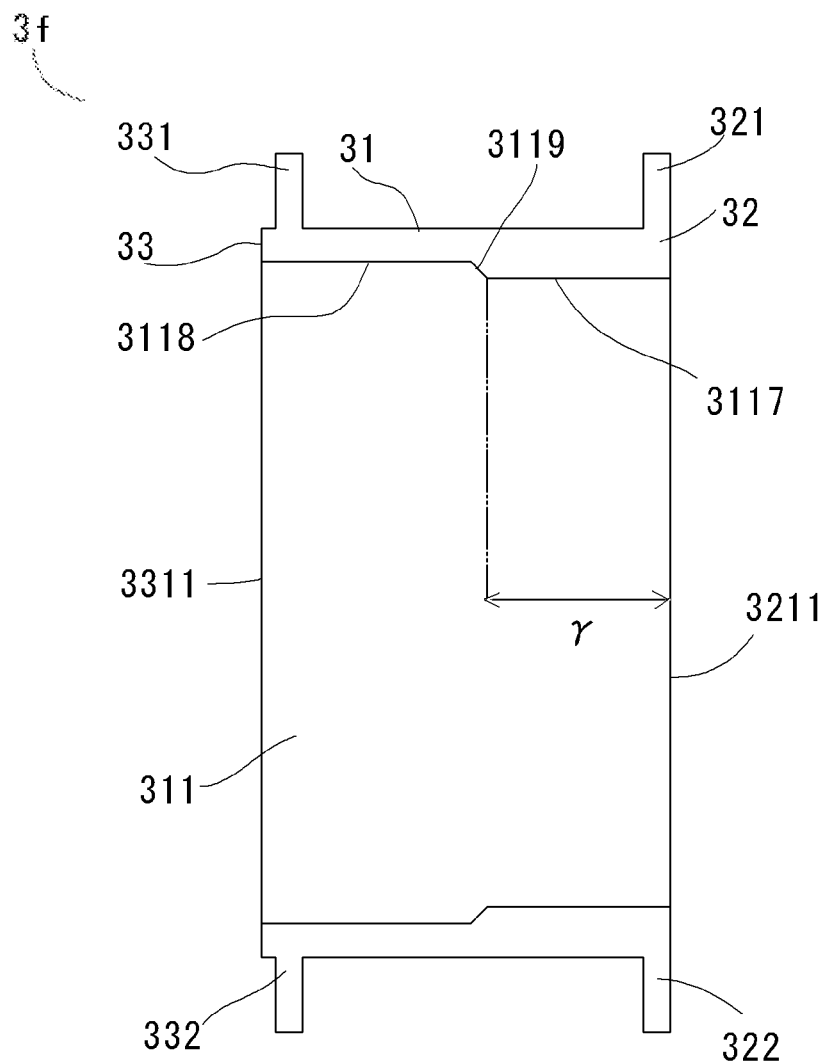

FIGS. 8A and 8B are views showing insulators each having a step section provided inside the tube portion 31. FIG. 8A is a plan view of an insulator 3e in which view the inner surfaces of the through-hole 311 are indicated by broken lines. FIG. 8B is a sectional view of an insulator 3f.

As shown in FIG. 8A, on a pair of surfaces opposed to each other in the direction perpendicular or substantially perpendicular to the longitudinal direction of the tube portion 31, a reduced width section 3114 is provided at one longitudinal end side of the tube portion 31 (at the side near the first flange 32, namely at the lower side in FIG. 8A). An increased width section 3115 is provided at the other longitudinal end side of the tube portion 31 (at the side near the second flange 33, namely at the upper side in FIG. 8A). When seen in the axial direction, the width of the increased width section 3115 in the direction perpendicular or substantially perpendicular to the longitudinal direction of the tube portion 31 is preferably larger than the width of the reduced width section 3114. A step section 3116 interconnecting the reduced width section 3114 and the increased width section 3115 is preferably provided between the reduced width section 3114 and the increased width section 3115 in the longitudinal direction of the tube portion 31. As shown in FIG. 8A, the step section 3116 is provided by a slant surface when seen in a plan view.

The length γ of the reduced width section 3114 in the longitudinal direction of the tube portion 31 is preferably equal to about 40% of the length of the tube portion 31 when measured from the open end near the first flange 32, for example. The length γ of the reduced width section 3114 may be greater than or less than about 40% of the length of the tube portion 31. In case where the length γ of the reduced width section 3114 is set greater than about 40% of the length of the tube portion 31, it is preferable to secure a dimension large enough to define the step section 3116 in the longitudinal direction of the tube portion 31. In the insulator 3e, the cross-sectional area of the through-hole 311 (the cross-sectional area of the through-hole 311 in the direction perpendicular or substantially perpendicular to the longitudinal direction of the tube portion 31 when seen in the axial direction) preferably increases toward the direction in which the jig is removed from the insulator 3e (toward the other longitudinal end side of the tube portion 31). Therefore, even if a strong external force is applied from the coil to the insulator 3e, and even if the external shape of the through-hole 311 is collapsed, it is easy to remove the jig from the insulator 3e.

The dimensional relationship between the insulator 3e and each of the teeth portions 12 may preferably be set as follows. The width of the reduced width section 3114 (in the direction perpendicular or substantially perpendicular to the longitudinal direction of the tube portion 31 when seen in a plan view, namely in the left-right direction in FIG. 8A) is smaller than the width TW of each of the teeth portions 12. The width of the increased width section 3115 (in the direction perpendicular to the longitudinal direction of the tube portion 31 when seen in a plan view, namely in the left-right direction in FIG. 8A) is preferably larger than or substantially equal to the width TW of each of the teeth portions 12.

When the insulator 3e is fitted to each of the teeth portions 12 along the extension direction of the latter, the insulator 3e can preferably be relatively smoothly moved with respect to each of the teeth portions 12 as the tip end of each of the teeth portions 12 moves along the increased width section 3115. As the tip end of each of the teeth portions 12 moves along the reduced width section 3114, the reduced width section 3114 interferes with the tip end of each of the teeth portions 12 because of the difference between the width TW of each of the teeth portions 12 and the width of the reduced width section 3114. Thus an interference fit state is generated between each of the teeth portions 12 and the reduced width section 3114.

As a consequence, it becomes possible to smoothly fit the insulator 3e to each of the teeth portions 12 and to prevent removal of the fitted insulator 3e from each of the teeth portions 12.

Referring to FIG. 8B, sections differing in the axial height of the through-hole 311 are preferably provided inside the tube portion 31 of the insulator 3f. A reduced axial width section 3117 is defined in the side of the through-hole 311 near the first flange 32 in the longitudinal direction of the tube portion 31 of the insulator 3f. An increased axial width section 3118 that is preferably larger in axial dimension than the reduced axial width section 3117 is provided at the side of the through-hole 311 near the second flange 33 in the longitudinal direction of the tube portion 31 of the insulator 3f. An axial step section 3119 interconnecting the reduced axial width section 3117 and the increased axial width section 3118 is provided between the reduced axial width section 3117 and the increased axial width section 3118. In FIG. 8B, the axial step section 3119 preferably has a slant surface. In the insulator 3f, the cross-sectional area of the through-hole 311 (the cross-sectional area of the through-hole 311 in the direction perpendicular or substantially perpendicular to the longitudinal direction of the tube portion 31 when seen in the axial direction) preferably increases toward the direction in which the jig is removed from the insulator 3f (toward the other longitudinal end side of the tube portion 31). Therefore, even if a strong external force is applied from the coil to the insulator 3f and even if the external shape of the through-hole 311 is collapsed, it is easy to remove the jig from the insulator 3f.

The dimensional relationship between the insulator 3f and each of the teeth portions 12 may preferably be set as follows. The axial dimension of the reduced axial width section 3117 is smaller than the axial height of each of the teeth portions 12. The axial dimension of the increased axial width section 3118 is larger than or substantially equal to the axial height of each of the teeth portions 12. The length γ of the reduced axial width section 3117 in the longitudinal direction of the tube portion 31 is equal to about 40% of the length of the tube portion 31 when measured from the open end near the first flange 32, for example.

When the insulator 3f is fitted to each of the teeth portions 12 along the extension direction of the latter, the insulator 3f can be relatively smoothly moved with respect to each of the teeth portions 12 as the tip end of each of the teeth portions 12 moves along the increased axial width section 3118. As the tip end of each of the teeth portions 12 moves along the reduced axial width section 3117, the reduced axial width section 3117 interferes with the tip end of each of the teeth portions 12 because of the difference between the axial width of each of the teeth portions 12 and the width of the reduced axial width section 3117. Thus, an interference fit state is generated between each of the teeth portions 12 and the reduced axial width section 3117.

As a consequence, it becomes possible to smoothly fit the insulator 3f to each of the teeth portions 12 and to prevent removal of the fitted insulator 3f from each of the teeth portions 12.

While both the upper taper surface 3111 and the lower taper surface 3112 are preferably defined in the insulators 3 and 3b shown in FIGS. 5A, 5B and 6, it is also possible to instead provide only one of the upper taper surface 3111 and the lower taper surface 3112 on the inner surfaces of the tube portion 31.

Similarly, while a pair of taper surfaces 3111 is preferably defined in the insulator 3c shown in FIG. 7A, it is also possible to instead provide only one of the taper surfaces 3111 in the insulator 3c.

The insulators 3e and 3f shown in FIGS. 8A and 8B may be combined with each other. It is also possible to include an insulator that includes not only the reduced width section 3114, the increased width section 3115, and the step section 3116 but also the reduced axial width section 3117, the increased axial width section 3118, and the axial step section 3119. In other words, one or both of the inner surfaces of the side walls 301 of the insulator 3, or one or both of the inner surfaces of the horizontal walls 302 of the insulator 3, may have the step sections 3116 and 3119 extending in the circumferential direction. The extension direction of the step sections 3116 and 3119 is not limited to the circumferential direction but may be any direction intersecting the radial direction. Preferably, the gap between the inner surfaces of the tube portion 31 at the other side of the step sections 3116 and 3119 is larger than the gap between the inner surfaces of the tube portion 31 at one side of the step sections 3116 and 3119.

Within the tube portion 31, at least two of the upper taper surface 3111; the lower taper surface 3112; the taper surface 3113; the combination of the reduced width section 3114, the increased width portion 3115, and the step section 3116; and the combination of the reduced axial width section 3117, the increased axial width section 3118, and the axial step section 3119 may be combined with each other.

Figure 9:
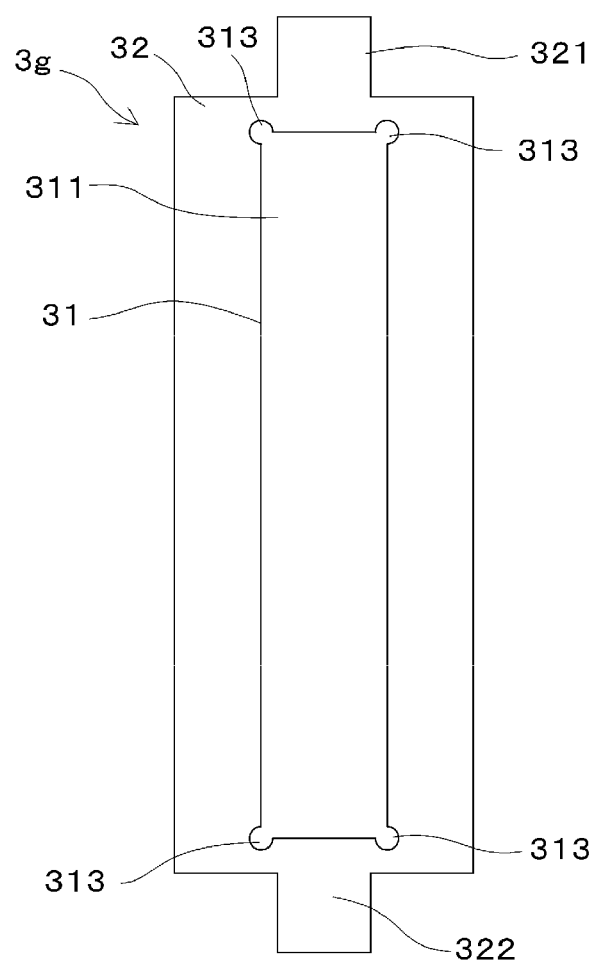
FIG. 9 is a view showing a still further modified example of the insulator according to a preferred embodiment of the present invention.

FIG. 9 is a front view showing a modified example of the insulator. The shape of the insulator 3g shown in FIG. 9 is preferably the same as the shape of other insulators. In FIG. 9, the open end of the through-hole 311 preferably has a substantially rectangular shape. Outwardly-depressed grooves 313 extending from one longitudinal end of the tube portion 31 to the other longitudinal end thereof are defined at four corners of the through-hole 311 where the side walls and the horizontal walls intersect. The grooves 313 preferably extend from the first flange 32 to the second flange 33 along the longitudinal direction of the tube portion 31. Alternatively, the grooves 313 may not necessarily extend all of the way from the first flange 32 to the second flange 33 along the longitudinal direction of the tube portion 31.

The cross section of each of the teeth portions 12 taken along the axial direction preferably has a substantially rectangular shape. Therefore, if the insulator 3g is fitted to each of the teeth portions 12, the four corner edges of each of the teeth portions 12 having a rectangular cross section come into the respective grooves 313. This helps prevent the corner edges of each of the teeth portions 12 from making contact with the four corners of the inner surfaces of the tube portion 31 (the surfaces defining the through-hole 311) such that the four corners of the through-hole 311 are prevented from being deformed or damaged.

Instead of providing the grooves 313, the four corner edges of the through-hole 311 may alternatively be chamfered. This also helps prevent the four corner edges of each of the teeth portions 12 from making contact with the four corners of the inner surfaces of the tube portion 31. Even if the corner edges of each of the teeth portions 12 comes into contact with the four chamfered corners of the inner surfaces of the tube portion 31, it is possible to reduce stress concentration on the four corners of the inner surfaces of the tube portion 31. This makes it possible to prevent the four corners from being damaged.

While illustrative preferred embodiments of the present invention have been described above, the present invention is not limited to these preferred embodiments. The respective components appearing in the preferred embodiments and modified examples described above may be appropriately combined unless contradictory to one another. While only the stator included in an inner-rotor-type motor having teeth extending radially inward has been disclosed in the foregoing preferred embodiments, the present invention is applicable to a stator included in an outer-rotor-type motor having teeth extending radially outward.

The present invention can be applied to a rotary electric machine having a stator core, such as, for example, a motor, a generator, or a compressor.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A stator, comprising:
an annular core-back portion;
a plurality of teeth portions extending radially from a circumferential surface of the core-back portion;
a plurality of insulators respectively mounted to the teeth portions; and
a plurality of coils respectively mounted to the insulators; wherein
each of the teeth portions includes a tip end and a base end, the tip end having a circumferential width equal to or smaller than a circumferential width of the base end and the tip end having an axial width equal to or smaller than an axial width of the base end;
each of the insulators includes a tube portion arranged to accommodate each of the teeth portions, the tube portion including a first opening existing at the tip end of each of the teeth portions and a second opening existing at the base end of each of the teeth portions; and
the first opening has an axial width smaller than an axial width of the second opening in a state that each of the insulators is removed from each of the teeth portions.

2. The stator of claim 1, wherein the tube portion includes a pair of side walls extending in a center axis direction and widening in a radial direction and a pair of horizontal walls extending in a circumferential direction and widening in the radial direction;
each of the teeth portions is accommodated within a space surrounded by the side walls and the horizontal walls; and
when each of the insulators is kept detached from each of the teeth portions, a gap between inner surfaces of the side walls or a gap between inner surfaces of the horizontal walls is arranged into a taper shape in at least a portion of the inner surfaces such that the gap increases from one side of the tube portion toward the other side of the tube portion.

3. The stator of claim 2, wherein the inner surfaces of the side walls and the inner surfaces of the horizontal walls are arranged to intersect one another in four regions, the tube portion being provided with an outwardly-depressed groove defined in at least one of the four regions.

4. The stator of claim 3, wherein the groove extends from one longitudinal end of the tube portion to the other longitudinal end of the tube portion.

5. The stator of claim 1, wherein the tube portion is press-fitted to each of the teeth portions.

6. The stator of claim 1, wherein
the tube portion includes a pair of side walls extending in a center axis direction and widening in a radial direction and a pair of horizontal walls extending in a circumferential direction and widening in the radial direction, each of the teeth portions is accommodated within a space surrounded by the side walls and the horizontal walls;
when each of the insulators is kept detached from each of the teeth portions, one or both of the inner surfaces of the side walls or one or both of the inner surfaces of the horizontal walls is provided with a step section extending in a direction intersecting the radial direction; and
a gap between the inner surfaces at one side of the step section being larger than a gap between the inner surfaces at the other side of the step section.

7. The stator of claim 6, wherein one or both of the inner surfaces of the horizontal walls is provided with the step section.

* * * * *